United States Patent
Smullin et al.

(10) Patent No.: US 11,580,275 B1
(45) Date of Patent: Feb. 14, 2023

(54) EXPERIMENTAL DISCOVERY PROCESSES

(71) Applicant: X Development LLC, Mountain View, CA (US)

(72) Inventors: Sylvia Joan Smullin, Menlo Park, CA (US); Albin Lee Jones, Half Moon Bay, CA (US); Michael Jason Grundmann, San Jose, CA (US)

(73) Assignee: X Development LLC, Mountain View, CA (US)

( * ) Notice: Subject to any disclaimer, the term of this patent is extended or adjusted under 35 U.S.C. 154(b) by 906 days.

(21) Appl. No.: 16/224,142

(22) Filed: Dec. 18, 2018

(51) Int. Cl.
*G06F 30/20* (2020.01)
*G01N 3/40* (2006.01)
(Continued)

(52) U.S. Cl.
CPC .............. *G06F 30/20* (2020.01); *G01N 3/40* (2013.01); *G06F 17/18* (2013.01); *G06N 5/04* (2013.01); *G06F 2111/08* (2020.01)

(58) Field of Classification Search
CPC ...... G06F 30/20; G06F 17/18; G06F 2111/08; G06F 30/23; G06F 30/367; G06N 5/04;
(Continued)

(56) References Cited

U.S. PATENT DOCUMENTS

| | | | |
|---|---|---|---|
| 2002/0013662 A1* | 1/2002 | Grass | A61P 31/12 702/22 |
| 2004/0071888 A1* | 4/2004 | Chondroudis | B01J 19/0046 506/32 |
| 2017/0293707 A1* | 10/2017 | Xin | H01M 4/1391 |

FOREIGN PATENT DOCUMENTS

| | | | | |
|---|---|---|---|---|
| CN | 1520557 A | * | 6/2004 | ............. G06Q 10/04 |
| CN | 102773981 A | * | 11/2012 | ............. Y02P 80/10 |

(Continued)

OTHER PUBLICATIONS

Cao et al., "How To Optimize Materials and Devices via Design of Experiments and Machine Learning: Demonstration Using Organic Photovoltaics", ACS Nano, Jul. 2018, 12(8):7434-7444.
Dehghannasiri et al., "Optimal experimental design for materials discovery", Computational Materials Science, Mar. 2017, 129:311-322.

(Continued)

*Primary Examiner* — Kandasamy Thangavelu
(74) *Attorney, Agent, or Firm* — Fish & Richardson P.C.

(57) ABSTRACT

A method for producing an experimental output satisfying an objective includes conducting an experimental execution process including applying a selection criterion to select an approach to determining a set of parameters for a set of experiments, and determining a first set of parameters for a first experiment according to the selected approach based on one or more of (i) a predicted relationship between a set of parameters and a characteristic of a corresponding experimental output, (ii) the measured characteristic of a second experimental output from a second experiment executed according to a second set of parameters, (iii) the objective, and (iv) a parameter selection rule. Conducting an experimental execution process includes controlling execution of the first set of experiments according to the first set of parameters, where execution of each first experiment includes conducting the experiment according to the first set of parameters to produce a first experimental output; and measuring the characteristic of the first experimental output. The method includes determining whether the objective is satisfied by the experimental execution process, and, when the objective is not satisfied by the experimental execution process, conducting a subsequent experimental execution process.

32 Claims, 7 Drawing Sheets

(51) Int. Cl.
 *G06F 17/18* (2006.01)
 *G06N 5/04* (2023.01)
 *G06F 111/08* (2020.01)
(58) Field of Classification Search
 CPC ....... G01N 3/40; B01J 19/0046; G06Q 10/04; G16B 15/13; G16B 20/20; H01M 4/1391; Y02P 80/10
 See application file for complete search history.

(56) References Cited

FOREIGN PATENT DOCUMENTS

| CN | 103914581 | A | * | 7/2014 | |
| CN | 102768700 | B | * | 2/2015 | ............ G06F 30/23 |
| CN | 108009389 | A | * | 5/2018 | ............ G06F 30/20 |
| CN | 105718683 | B | * | 8/2018 | ........... G06F 30/367 |
| EP | 3101488 | A1 | * | 12/2016 | ............ G06F 30/00 |
| JP | 2018519822 | A | * | 7/2018 | ............ G16B 20/20 |
| KR | 20030059196 | A | * | 7/2003 | ............ G16B 15/30 |

OTHER PUBLICATIONS

Gopakumar et al., "Multi-objective Optimization for Materials Discovery via Adaptive Design", Nature Scientific Reports, Feb. 27, 2018, 12 pages.

Ling et al., "High-Dimensional Materials and Process Optimization using Data-driven Experimental Design with Well-Calibrated Uncertainty Estimates", arXiv, Apr. 4, 2017, 16 pages.

Lu et al., "Data mining-aided materials discovery and optimization", J Materiomics, Sep. 2017, 3(3):191-201.

Mueller et al., "Machine Learning in Materials Science: Recent Progress and Emerging Applications" Review in Computational Chemistry, May 2016, 29:186-272.

Nikolaev et al., "Autonomy in materials research: a case study in carbon nanotube growth", Computational Materials, Oct. 2016, 2, 16031, 6 pages.

Ueno et al., "COMBO: An efficient Bayesian optimization library for materials science", Materials Discovery, Jun. 2016, 4:18-21.

Xue et al., "Accelerated search for BaTiO3-based piezoelectrics with vertical morphotropic phase boundary using Bayesian learning" PNAS, Nov. 2016, 113(47):13301-13306.

Xue et al., "Accelerated search for materials with targeted properties by adaptive design" Nature Communications, Apr. 2016, 7, 11241, 9 pages.

Xue et al., "An informatics approach to transformation temperatures of NiTi-based shape memory alloys", Acta Materialia, Feb. 2017, 125:532-541.

Xue et al., "Phase-Mapper: An AI Platform to Accelerate High Throughput Materials Discovery" arXiv:1610.00689v2, Oct. 7, 2016, 9 pages.

\* cited by examiner

EXPERIMENTAL DISCOVERY PROCESSES

BACKGROUND

Experimental design is the process of selecting parameters for an experiment or set of experiments with the goal of achieving a particular objective, e.g., a material with a desired property, a paint with a desired visual appearance, or a structural design with a target strength-to-weight ratio. Searching for the parameters that provide the desired result is an iterative process that can involve multiple experiments or sets of experiments, each with a different parameter set. In the specific example of materials development, a property of a material (e.g., mechanical properties such as hardness or modulus; electrical properties such as conductivity or dielectric constant; or optical properties such as reflectivity or refractive index) can be affected by factors including the composition of the material, the structure of the material, and the process used to produce the material. When developing a material, a series of experiments can be performed in which parameters of the experiments are varied to affect the material composition, material structure, or fabrication process, and properties of the resulting material are measured. The objective of a materials development process can be to identify those parameters that result in a material with a desired property or to optimize a material based on a certain function of one or more of its properties.

SUMMARY

In an aspect, a computer-implemented method for producing an experimental output satisfying an objective includes conducting an experimental execution process. Conducting an experimental execution process includes, by a computing system, applying a selection criterion to select a particular approach to determining a set of parameters for a set of one or more experiments from among multiple approaches. Each experiment, when conducted, produces an experimental output. Conducting an experimental execution process includes, by the computing system, determining a first set of parameters for a first set of one or more experiments according to the particular approach. The determining is based on one or more of (i) a respective predicted relationship between a set of parameters and a characteristic of a corresponding experimental output, (ii) the measured characteristic of a second experimental output from a second experiment executed according to a second set of parameters, (iii) the objective for the experimental output, and (iv) a parameter selection rule. Conducting an experimental execution process includes controlling execution of the first set of one or more experiments according to the first set of parameters. The execution of each first experiment includes conducting the first experiment according to the first set of parameters to produce a first experimental output; and measuring the characteristic of the first experimental output. The method includes determining whether the objective is satisfied by the experimental execution process. The method includes, when the objective is not satisfied by the experimental execution process, conducting a subsequent experimental execution process.

Embodiments can include one or more of the following features.

The applying of the selection criterion is based on the objective and on a probability associated with each of the multiple potential approaches.

The applying of the selection criterion includes a random selection of the particular approach.

When the determining of the first set of parameters is based on the parameter selection rule, the determining of the set of parameters is at least partially random.

The method includes iteratively: determining whether the objective is satisfied, and conducting a subsequent experimental execution process when the objective is not satisfied. The method includes stopping the iterations when the objective is satisfied.

The objective is indicative of an optimization of an objective function and an experimental constraint. Determining whether the objective is satisfied includes one or more of (i) determining that the characteristic of at least one the first experimental outputs satisfies the optimization of the objective function and (ii) determining that the experimental constraint has been achieved.

The method includes updating the probability associated with one or more of the multiple approaches based on the measured characteristic of each first experimental output. The method includes selecting, from among the multiple approaches, a second particular approach based on the updated probability.

The method includes updating one or more of the multiple approaches based on the measured characteristic of each first experimental output.

Applying the selection criterion to select a particular approach includes performing a tiered selection process.

Applying a selection criterion to select a particular approach includes selecting multiple approaches; and in which determining the first set of parameters includes synthesizing parameters determined by each of the multiple approaches.

Conducting the first set of one or more experiments includes fabricating a physical sample for each first experiment; and in which measuring the characteristic of each first experimental output includes measuring a physical characteristic of each physical sample. Fabricating a physical sample includes synthesizing a pharmaceutical. Fabricating a physical sample includes fabricating a thin film structure. Fabricating a physical sample includes fabricating a bulk sample of a material.

Conducting the first set of one or more experiments includes performing a calculation for each first experiment.

In an aspect, a system for producing an experimental output having a characteristic satisfying an objective includes an experimental module configured to conduct an experimental execution process. The experimental execution process includes conducting a first set of one or more experiments according to a first set of parameters to produce corresponding first experimental outputs; and measuring the characteristic of each first experimental output. The system includes a computing system including one or more processors coupled to a memory. The computing system is configured to control operation of the experimental module and to implement multiple advisory modules. Each advisory module is configured to determine a set of parameters for an experiment based on one or more of (i) a respective predicted relationship between a set of parameters and the characteristic of a corresponding experimental output, (ii) the measured characteristic of a second experimental output from a second experiment executed according to a second set of parameters, (iii) the objective, and (iv) a parameter selection rule. The computing system is configured to implement a panel controller configured to apply a selection criterion to select a particular one of the advisory modules to determine the first set of parameters for the first set of one or more experiments, and to determine whether the objective is satisfied by the experimental execution process. The computing system is configured to control the experimental module to conduct a subsequent experimental execution process when the objective is not satisfied by the experimental execution process.

Embodiments can include one or more of the following features.

The panel controller is configured to select the particular one of the advisory modules based on the objective and on a probability associated with each of the advisory modules and the objective.

The panel controller is configured to select randomly the particular one of the advisory modules.

An advisory module configured to determine a set of parameters based on a parameter selection rule is configured to determine the set of parameters at least partially randomly.

The panel controller is configured to determine whether the objective is satisfied iteratively with the conducting of a subsequent experimental execution process. The panel controller is configured to stop the iterations when the objective is satisfied.

The objective is indicative of optimization of an objective function subject to one or more experimental constraints. Determining whether the objective is satisfied includes (i) determining that the characteristic of the first experimental output satisfies the optimization of the objective function and (ii) determining that the experimental constraints have been satisfied.

The panel controller is configured to update the probability associated with one or more of the multiple advisory modules based on the measured characteristic of the one or more first experimental output. The panel controller is configured to select, from among the multiple advisory modules, a second particular advisory module based on the updated probability.

At least one of the advisory modules is configured to update the corresponding predicted relationship based on the first set of parameters and the measured characteristic of the one or more first experimental outputs.

The experimental module is configured to conduct the first set of one or more experiments to produce corresponding first physical samples each fabricated according to the first set of parameters; and measure a physical characteristic of each first physical sample.

The implementation of an experimental discovery process using multiple advisory modules can have one or more of the following advantages. The use of multiple advisory modules can mitigate the potential lack of knowledge about the most accurate model of a system at the outset of a discovery process by providing access to a range of different models. This approach enables the experimental design process to be continually refined in real time to efficiently and effectively converge on a target outcome of the process. These approaches are generally applicable to experimental discovery in a wide variety of fields including materials development, chemistry or biochemistry, drug discovery, development of paint formulations, and structural analysis, among others.

DETAILED DESCRIPTION

Experimental discovery is the process of identifying a set of parameters such that an experiment carried out according to that set of parameters produces an output that satisfies an objective. This disclosure relates generally to a system that implements a closed-loop, predictive process for efficient experimental design. In this approach, a number of models (referred to as "advisors") contribute to the experimental design process, with the selection of a particular advisor for a given portion of the process being controlled by a "super-advisor" based on factors such as each model's probability of success. This approach enables the experimental design process to be continually refined in real time to efficiently converge on a target outcome of the process. This approach to experimental design is widely applicable to various fields including materials development, chemistry or biochemistry, drug discovery, development of paint formulations, and structural analysis, among others.

Figure 1:
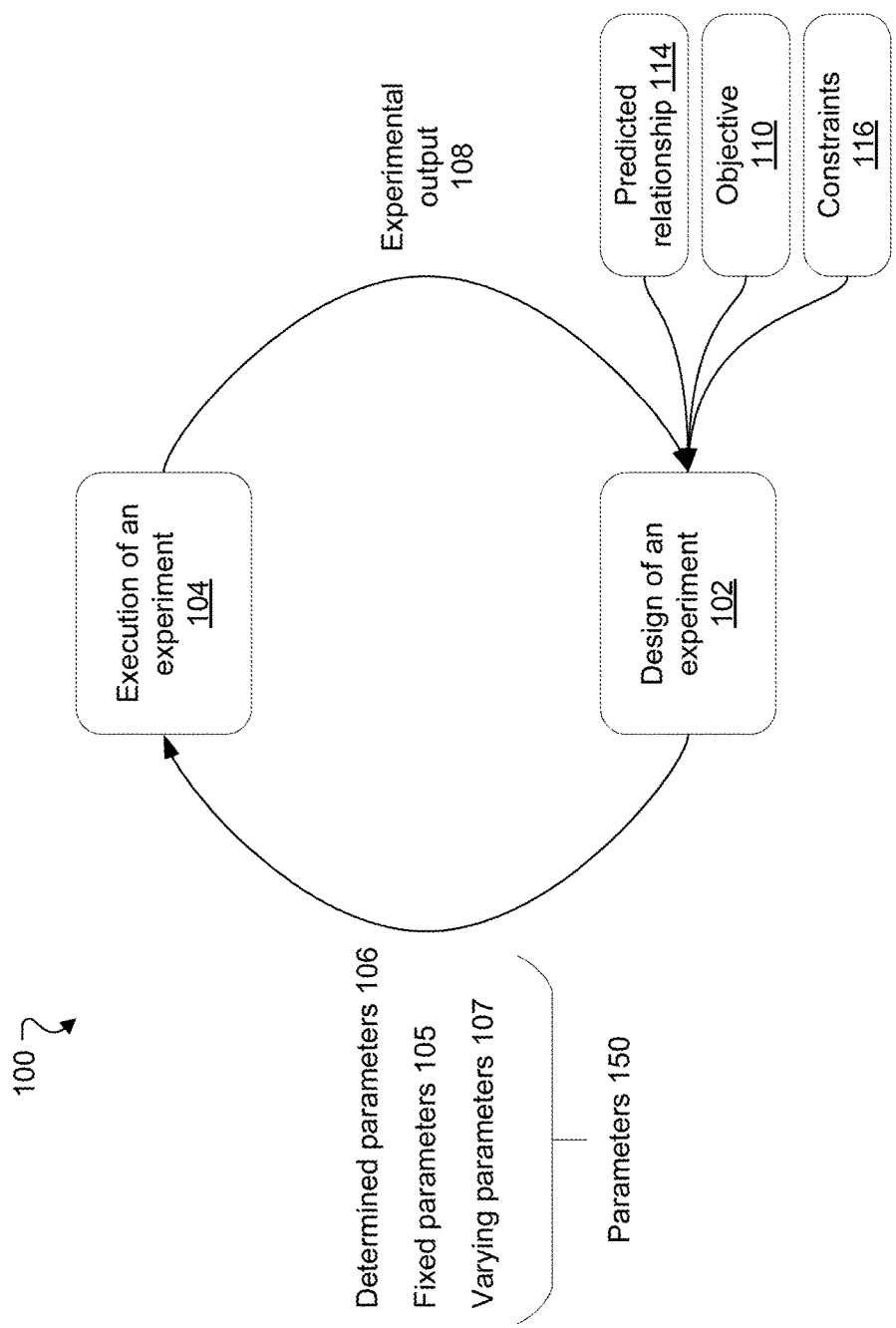
FIG. 1 is a diagram of an experimental discovery process.

Referring to FIG. 1, experimental discovery can be a closed-loop process 100 that encompasses the sequential, iterative design 102 of experiments and execution 104 of experiments to achieve an experimental result satisfying an objective 110. An experiment is a process carried out according to a specified set of parameters 150 and that produces an output 108 that has a characteristic that can be measured. Measured characteristics of the output 108 of an experiment are referred to as experimental output data from the experiment. The set of parameters 150 can include one or more parameters 106 that are determined by the experimental design 102 (discussed below), one or more parameters 105 that are fixed (e.g., set by an operator), and/or one or more parameters 107 that vary and may affect the experiment but that are not controlled.

The design 102 of experiments includes the determination of different parameters 106 for each of one or more experiments (or batch of multiple experiments). Across the one or more experiments or batches of experiments carried out in the experimental discovery process 100, the parameters 106 are chosen such that least one of the experiments is likely to produce an output 108 satisfying the objective 110 (we sometimes refer to this as the set of parameters satisfying the objective). Satisfaction of the objective 110 encompasses optimization of an objective function subject to one or more experimental constraints, discussed further below. The design 102 of experiments can be an iterative process in which a set of parameters 106 for a subsequent experiment or batch of experiments can be determined based at least in part on sets of parameters for previous experiments and their respective experimental output data. Through the iterative refinement of sets of parameters in the design 102 process, a set of parameters 106 can be identified that satisfies the objective 110.

In some examples, the experiments can be physical experiments that produce physical outputs. By way of illustration, we describe throughout this description an example in which the physical experiments are thin film deposition processes in which a multi-layer thin film structure is formed on a substrate by vapor deposition. Example parameters for thin film deposition experiments can include, e.g., for each layer of the multi-layer structure, the composition of the layer, the deposition time, the deposition temperature, the pressure in the deposition chamber of the vapor deposition system, the deposition rate, the time and temperature for a post-deposition anneal. The output of a thin film deposition experiment is a sample including a substrate with a multi-layer thin film structure deposited thereon. Output data (measured characteristics of the sample) can include, e.g., the reflectivity of the multi-layer structure, the resistivity or conductivity of the multi-layer structure, the X-ray diffraction (XRD) spectrum of the multi-layer structure, a mechanical property (e.g., hardness or yield point) of the multi-layer structure.

In some examples, the experiments can be virtual experiments, such as computer executed simulations of a physical system. Parameters in a virtual experiment are the inputs into one or more calculations of the simulation. In the context of a virtual experiment, the experimental output data are sometimes referred to as synthetic data. In one example of a virtual experiment, a first principles simulation of a phase diagram of a materials system can be executed, with the parameters of the experiment being the time step resolution of the simulation and the outputs of the experiment being a combination of the processing time to complete the simulation and the accuracy of the simulation result as compared to real experimental data Other examples of physical and virtual experiments for which the approaches to experimental discovery described here are applicable are described below.

The objective 110 of the experimental discovery process can be the optimization of an objective function subject to one or more experimental constraints. By optimization of an objective function subject to a constraint, we mean obtaining the maximum or minimum for the objective function within the constraint (e.g., within a certain number of experiments), or come as close as possible to a target value for the objective function within the constraint. Example experimental constraints can include maximum number of experiments, amount of time for the experimental discovery process, amount of resources (e.g., materials, computational time, etc.) expended, or other types of constraints. An experimental discovery process that produces an experimental output satisfying an objective means that an experimental output from at least one experiment conducted during the experimental discovery process achieves the desired optimization of the objective function subject to the one or more experimental constraints.

In some examples, the objective function can be based directly on the experimental output data, e.g., optimizing a measured characteristic of the experimental output 108. This type of objective function is sometimes referred to as a direct objective function. In the example of the multi-layer thin film structure, an example of a direct objective function can be the reflectivity of the multi-layer thin film structure at a given wavelength. For instance, the objective can be production of a multi-layer thin film structuring having a maximum reflectivity at a wavelength of 870 nm after 25 experiments.

In some examples, the objective function can be based indirectly on the experimental output data. This type of objective function is referred to as an indirect objective function. For instance, an indirect objective function can be based on a characteristic of the experimental output 108 that is not measured but that is related to a measured characteristic. In the example of the multi-layer thin film structure, an example of an indirect objective function can be the degree of crystallinity of the multi-layer structure, where the degree of crystallinity is related to the XRD spectrum of the multi-layer structure (a measured characteristic) via a previously specified model. In some examples, an indirect objective function can be based on a combination of a measured or related characteristic of the experimental output and an external factor, such as a constraint on time, budget, or resources. An example of such an indirect objective function can be a function that is a combination of the crystallinity of the multi-layer structure (which itself is based on the measured XRD spectrum of the multi-layer structure) and the materials cost for fabrication of the multi-layer structure. The corresponding objective can be the production of a multi-layer structure having a maximum value for that indirect objective function after a prescribed number of experiments.

In some examples, experimental output data can include sources of error, such as random or systematic noise arising from human error during set-up or execution of the experiment, imprecision in measurement techniques, inaccuracies in measurement techniques, environmental noise, quantum noise, or noise that is intentionally introduced into a calculation. In some examples, the noise in the output data from a first experiment can be modeled and at least partially accounted for, e.g., in the selection of parameters for a subsequent experiment. In some examples, the exact value of the noise may not be known, which can introduce uncertainty into the "true" value of the output data. In some examples, e.g., in calculations, errors due to rounding can be introduced.

The design 102 of experiments can be implemented according to a predicted relationship 114 between a set of parameters and output data from an experiment executed according to that set of parameters (referred to for brevity as a relationship between parameters and experimental output). An example of a predicted relationship between parameters and experimental output can be a model that predicts the experimental output resulting from a given set of parameters. The design 102 of experiments can be subject to one or more constraints 116, such as physical laws (e.g., laws of gravity or electromagnetism), system constraints (e.g., maximum allowed thickness for the multi-layer structure, whether symmetry in a system is required or prohibited), experimental constraints such as time or economic constraints (e.g., budgets for time, resource (e.g., materials) utilization, or number of experiments), or other constraints.

Figure 2:
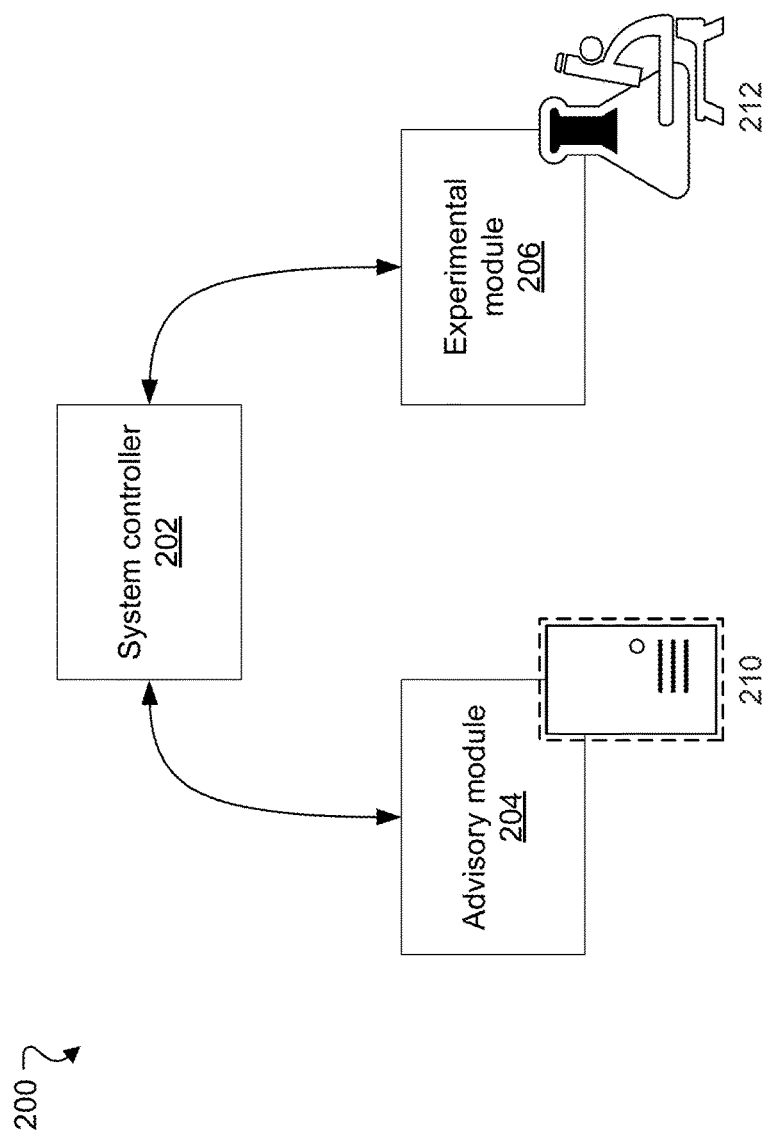
FIGS. 2 and 3 are diagrams of systems for implementing experimental discovery processes.

Referring to FIG. 2, an example system 200 for implementing an experimental discovery process includes a system controller 202, an advisory module 204, and an experimental module 206. The advisory module 204 implements the experimental design, determining sets of parameters for experiments to be executed by the experimental module 206. The system controller 202 controls the operation of the experimental module 206, e.g., acting as an interface between the advisory module 204 and the experimental module 206. In some example, the system controller 202 can determine when the objective of the experimental discovery process has been achieved.

The advisory module 204 determines a set of parameters for a first experiment or batch of experiments, e.g., according to a model implemented by the advisory module, based on the results of any prior experiments, according to a parameter selection rule (e.g., a rule specifying random selection of parameters), or according to another approach. Although we describe FIG. 2 with respect to individual experiments, a similar approach can be taken for batches of experiments. The advisory module 204 provides the set of parameters to the system controller 202, which controls the experimental module 206 to carry out the experiment. Upon completion of the experiment and measurement of the output of the experiment, the experimental module 206 provides experimental output data back to the system controller 202. The system controller 202 determines whether a stopping criterion has been achieved (discussed further below), and if not, provides the experimental output data back to the advisory module 204. The advisory module 204 can then determine a second set of parameters for a second experiment. For instance, the advisory module 204 can determine the second set of parameters based at least in part on the experimental output data from the first experiment. In some examples, e.g., when the objective function is an indirect objective function, the system controller 202 can process the experimental output data and provide the processed experimental output data to the advisory module 204; in some examples, this processing can be carried out by the advisory module 204.

The process of executing experiments and determining sets of parameters for subsequent experiments, e.g., based at least in part on experimental output data from one or more prior experiments, can be an iterative process. For instance, the iterative process can proceed iteratively until the system controller 202 determines that a stopping criterion has been achieved. A stopping criterion can be that the objective has been satisfied, e.g., that a constraint has been met, e.g., a constraint on time, number of experiments, or other constraints. For instance, the iterative process can be stopped after a certain number of experiments have been carried out. In some examples, a stopping criterion can be that optimization of the objective function was achieved. For instance, the iterative process can be stopped after a target value for the objective function is obtained. In some examples, the stopping criterion can be an indication of a status of the results, such as that a maximum or minimum value for the objective function has not changed (or has not changed more than a threshold percentage) in a set number of experiments, such as the past ten experiments. In some examples, the stopping criterion can be a combination of optimization of the objective function and meeting of a constraint; or another stopping criterion.

The controller 202 and advisory module 204 can be implemented by one or more processors. In some examples (e.g., as shown in FIG. 2), the controller and the advisory module 204 are implemented by the same one or more processors of a computing system 210; in some examples, the controller and the advisory module 204 are each implemented by a different processor or processors.

The experimental module 206 can include equipment 212 for carrying out the experiment and equipment for measuring characteristics of the experimental output. In the example of the multi-layer thin film structure, the experimental module 206 can include, for instance, a vacuum deposition system that is controlled by the system controller 202; and a measurement tool, such as a reflectometer or an X-ray diffraction spectrometer. Other examples of experimental modules 206 are described below. Where the experiments are virtual experiments, the experimental module 206 can include computing systems, e.g., the one or more processors and memory, that execute the virtual experiments. In some examples, the experimental module 206 can be an automated module under the control of the controller 202. In some examples, one or more aspects of the execution of the experiment can be performed by an operator.

Figure 3:
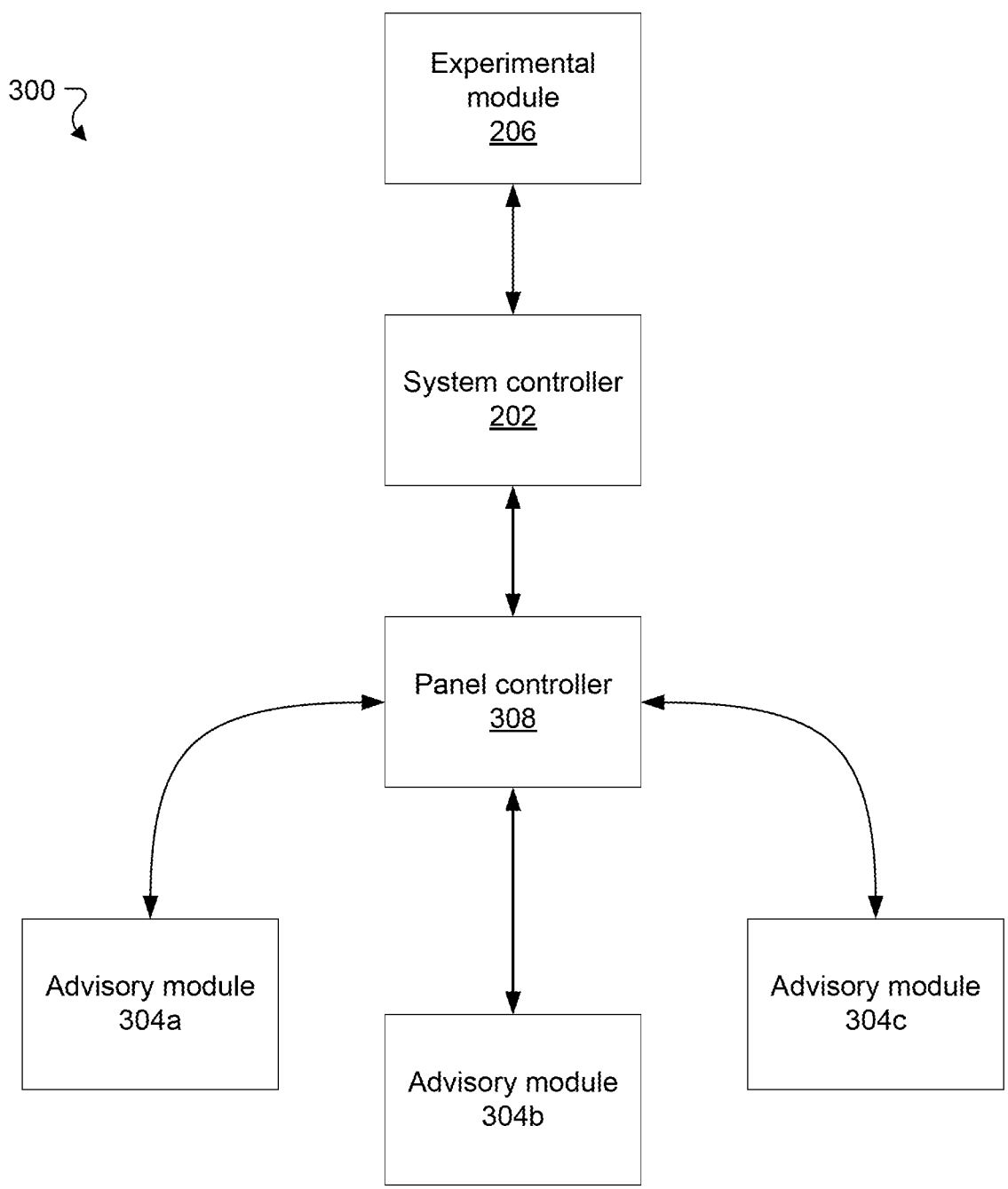

At the outset of an experimental discovery project, such as a materials development project, it may not necessarily be known what type of advisory module may be most accurate in guiding the experimental discovery process, e.g., what approach to the determination of parameters can most effectively or most efficiently converge to a set of parameters that satisfies the objective of the experimental discovery. Referring to FIG. 3, in an example system for implementing an experimental discovery process, a panel 302 of multiple advisory modules 304a, 304b, 304c (referred to collectively as advisory modules 304) can be deployed in parallel, with a panel controller 308 managing the operation of the panel of advisory modules 304. Each advisory module 304 of the panel 301 can implement a different approach to determining a set of parameters for an experiment. For instance, the advisory modules can apply different physical models or different approaches to random selection of parameters, can operate under different constraints, can receive different external knowledge as input.

The panel controller 308 makes a selection of a particular advisory module (e.g., the advisory module 304a) from the panel 302 for each experiment in the experimental discovery process. The set of parameters proposed by the selected advisory module 304a are used in the experiment carried out by the experimental module 206. The selection of an advisory module 304 from the panel 302 can be according to a selection rule specifying, e.g., random selection, sequential selection, probabilistic selection (e.g., based on a probability of success of each of the advisory modules 304), or based on another approach, as discussed further below.

The panel controller 308 can select an advisory module 304 on a per-experiment basis. In some examples, this per-experiment selection can result in a different advisory module being selected for each experiment. In some examples, a particular advisory module can be selected more than once, e.g., consecutively or non-consecutively, across multiple experiments.

In general, the utility of a given advisory module 304 is determined by the utility of its proposed sets of parameters in achieving the objective. For each particular experiment, the utility of the panel controller 308 is exactly the utility of the advisory module 304 selected for that experiment. Across multiple experiments, in which the selected advisory module 304 may be different for one or more of the multiple experiments, the utility of the panel controller 308 approaches the utility of the best advisory module 304 for the context of the particular experimental discovery process, even if the identity of the best advisory module 304 is not known at the outset of the experimental discovery process.

In the system of FIG. 3, after selecting a particular advisory module (e.g., the advisory module 304a) for a given experiment, the panel controller 308 asks the selected advisory module 304a to determine a set of parameters for the experiment. The selected advisory module 304a determines the set of parameters and provides the set of parameters to the panel controller 308, which in turn relays the set of parameters to the system controller 202. The system controller 202 controls the experimental module 206 to carry out the experiment. Upon completion of the experiment and associated measurements, the experimental module 206 provides experimental output data back to the system controller 202. The operation of the system controller 202 and the experimental module 206 can be substantially similar to that described with respect to FIG. 2.

The system controller 202 provides the experimental output data back to the panel controller 308 or determines that a stopping criterion has been achieved (discussed below). If further experimentation is appropriate, the panel controller 308 can then select an advisory module 304 to determine a set of parameters for a subsequent experiment.

Each advisory module 304 implements a different approach to determining sets of parameters. Some advisory modules 304 can implement approaches to parameter determination that are detached from experimental results, e.g., random selection of parameters, selection of parameters for successive experiments via a grid search approach, or other approaches that do not take into account experimental results. Some advisory modules 304 can implement approaches to parameter determination that are model-based, e.g., based on predicted relationships between parameters and experimental output data. For instance, model-based approaches can include a low-dimensional parametric model of a specific physical phenomenon, a predictive neural network trained on a large corpora of lower-fidelity actual or simulated experimental output data, a non-parametric model (e.g., a model of a stochastic process such as a Gaussian process), or other types of predicted relationships. Further description of the implementation of the advisory modules 304 is provided below.

Each advisory module 304 can have an associated probability of success, which is a probability that the set of parameters determined by the advisory module will achieve the objective. In some examples, the probabilities of success for the advisory modules can be based on, e.g., a priori information possessed by the panel controller 306 about the accuracy of the approaches to parameter determination implemented by the advisory modules 304. In some examples, the estimated probabilities of success for the advisory modules can be dynamically updated by the panel controller 308 during the experimental discovery process based on experimental outcomes. For instance, the probability of success of an advisory module can be updated by the panel controller following an experiment carried out according to parameters determined by that advisory module, e.g., to reflect how well the set of parameters determined by that advisory module satisfied the objective.

For each experiment carried out by the advisory module, the panel controller 308 selects one of the advisory modules 304 to determine the set of parameters for the experiment. The panel controller 308 uses a selection criterion to make the selection of the advisory module. In some examples, the selection criterion causes the panel controller 308 to select an advisory module using an approach that is based on the probabilities of success for the advisory modules 304. In some examples, the selection criterion causes the panel controller 308 to select an advisory module 304 using an approach that is detached from the probabilities of success of the advisory modules 304, e.g., random selection of an advisory module, sequential selection of each of the advisory modules, or other approaches. In some examples, a combination of a probability-based selection approach and an approach detached from the probabilities of success can be used.

In a specific example, the panel controller 308 can manage the selection of advisory modules 304 according to a Bernoulli bandit approach. In this approach, the panel controller repeatedly chooses among n independent advisory modules $A_1, \ldots A_n$, with each choice (sometimes referred to as a trial) yielding either success or failure (e.g., satisfaction or not of the objective). The advisory module $A_i$ yields success with a probability $p_i$ (and thus yields failure with a probability $1-p_i$), but the probabilities $p_i$ are unknown to the panel controller. The panel controller attempts to maximize the cumulative success across a sequence of many trials in spite of these unknown probabilities. The panel controller can implement any of a variety of sampling strategies to maximize the cumulative success, such as a random sampling strategy or a greedy sampling strategy.

In a random sampling strategy, the panel controller chooses an advisory module randomly for each trial, with each choice being independent from each other choice and with each advisory module being weighted uniformly. The expected cumulative success across T trials of the random sampling strategy is $$PT = \frac{1}{n}(p_1 + \ldots + p_n)T, \text{ where } P = \frac{1}{n}(p_1 + \ldots + p_n)$$

is the mean success probability for an arbitrary trial.

In a $(1-\varepsilon)$-greedy sampling strategy, for each trial, the panel controller selects either an explore option (with probability $\varepsilon$) or an exploit option (with probability $(1-\varepsilon)$). Under the explore option, an advisory module is chosen randomly. Under the exploit option, the panel controller chooses the advisory module with the highest probability of success. In some examples, the probability of success for each advisory module can be estimated by the panel controller based on the outcome of one or more previous trials.

In another specific example, the panel controller can manage the selection of advisory modules according to a Thompson sampling strategy, which incorporates the Bernoulli bandit strategy described above from a Bayesian perspective. In a Thompson sampling strategy, the unknown success probabilities for the advisory modules become random variables characterized by a probability distribution, e.g., across a unit interval. For instance, the initial probability distribution can be purely uninformative (e.g., with success probabilities for the advisory modules uniformly distributed across the unit interval) or can be based on previous experience, e.g., outcomes of previous experiments using the advisory modules. Over time, the probability distribution of the advisory modules evolves as experimental outcomes are observed.

In the Thompson sampling strategy, for a given trial, the panel controller hypothesizes plausible values for the success probability for each advisory module based on the probability distribution of the advisory modules. The panel controller then selects the advisory module having the highest hypothesized success probability for that trial. Once the outcome of that trial is received by the panel controller, the hypothesized success probability for the selected advisory module is updated according to the trial outcome, which results in an updated probability distribution.

In some examples, the panel controller 308 can produce a set of parameters for an experiment that is derived from parameters determined by a combination of multiple advisory modules. For instance, the panel controller 308 can produce a set of parameters in which each parameter is the mean or median of that parameter across all advisory modules, or can produce a set of parameters in which some parameters are obtained from one advisory module and other parameters are obtained from a different advisory module. In general, the panel controller 308 can determine how many advisory modules to select from and how to synthesize the proposed sets of parameters received from the advisory modules (e.g., to accept, ignore, modify, and/or combine the sets of parameters, in all or in part, from each advisory module).

The panel controller 308 can implement the advisory module selection according to a stopping criterion that specifies when the experimental discovery process is to be stopped. In some examples, a stopping criterion can be a local or absolute maximum or minimum for the objective function. In some examples, e.g., if the experimental discovery process is being performed in a black-box environment, it may not be possible to determine whether a local maximum or minimum for the objective function has been reached, and a different stopping criterion can be implemented. Examples of stopping criteria can include the expenditure of a predefined amount of time, money, or resources, or when there is an experiment that produces experimental output data meeting a specific threshold. For instance, in the example of the multi-layer thin film deposition experiments, example stopping criteria can include the multi-layer structure having a reflectivity of at least a threshold value at a particular wavelength or a resistivity of less than a threshold value.

In some examples, the panel controller 308 or the system controller 202 or both can implement constraints on the parameters determined by the advisory modules, such as maximum or minimum values or specified allowed or prohibited values. In some examples, the panel controller 308 or the system controller 202 can constrain the parameters to be discretized. In some examples, the panel controller 308 or the system controller 202 can constrain the parameters to satisfy certain characteristics, e.g., integers, rational numbers, real numbers, or other characteristics. For instance, in the example of the multi-layer thin film deposition experiments, the panel or system controller can constrain the pressure in the deposition system to be less than 1 Torr and can constrain the deposition time for each layer to be given in 1 second increments.

In some examples, e.g., if the experimental system is a noisy system, multiple experiments can be executed with each set of parameters. In some examples, the system controller 202 can determine if the noise of the experimental system is such that multiple experiments are to be carried out.

Returning to the implementation of the advisory modules, each advisory module 304 implements an approach to determining sets of parameters. In some examples, an advisory module can implement a model of the experimental system, such as a black box model, a gray box model, or a white box model. A model can include a hypothesis of the relationship between the parameters and the experimental output data. In determining a set of parameters for an experiment, an advisory module determines the parameters that will give rise to desired output data according to the model implemented by the advisory module.

In some examples, a model implemented by an advisory module can include one or more other aspects beyond the hypothesized relationship between parameters and experimental output data, as described in the following paragraphs.

A model can include a model of noise, such as an implicit or explicit model of noise. For instance, the model of noise can assume the presence of normally-distributed noise.

A model can include model parameters. In some examples, a model can be a Class 1 model, e.g., a parametric model, that has a bounded, known number of parameters, e.g., parameters that are independent from each other. The number of parameters can be less than the number of samples. In some examples, a model can be a Class 2 model, e.g., non-parametric model that has an unbounded number of parameters. Examples of non-parametric models include Gaussian Processes (GP), Fourier series, and artificial neural nets.

A model can incorporate a machine learning process for refining the model based on experimental output data. In some examples, such as in a Class 1 model, such a process can incorporate system identification, parameter identification, or regression (e.g., least-squares or maximum likelihood analysis) processes for learning or refining. In some examples, such as in a Class 2 model, there can be an empirical covariance for a GP that is deduced from a large amount of prior data. In some examples, a GP can be updated using standard techniques. For instance, hyperparameters of a GP can be adjusted using a maximum likelihood approach. A model can incorporate a loss function, e.g., as part of the learning or refining process. A loss function can encompass a judgement of the importance of various factors.

A model can incorporate an approach to reducing the degrees of freedom, avoiding overfitting, or comparing various versions of a model. For instance, a Class 1 model can incorporate regularization; a Class 2 model can incorporate annealing.

A model can be responsive to opportunities to incorporate external knowledge that is separate from the experimental output data. In gray box or white box models, external knowledge can be incorporated into the definition of the model itself, e.g., to make a Class 1 model. In some examples, such as in a Class 1 model, external knowledge can be incorporated into a maximum likelihood analysis. In some examples, such as in a Class 2 model, external knowledge can be incorporated into empirical covariance, e.g., to enable transfer learning of hyperparameters from another set of data.

A model can include a prediction of what experimental output data will result from a given set of input parameters. For instance, the prediction can be in the form of a probability distribution function.

A model can include an acquisition function, which can be a description of how to choose which experiment to do next according to the model. For instance, an acquisition function can be an expected improvement technique or another technique from a black box optimization approach. In some examples, choosing an optimization function can involve a tradeoff between exploring and exploiting. In some examples, choosing an optimization function can take into account computational expense. In some examples, the acquisition function can make use of the model's prediction output.

Figure 4:
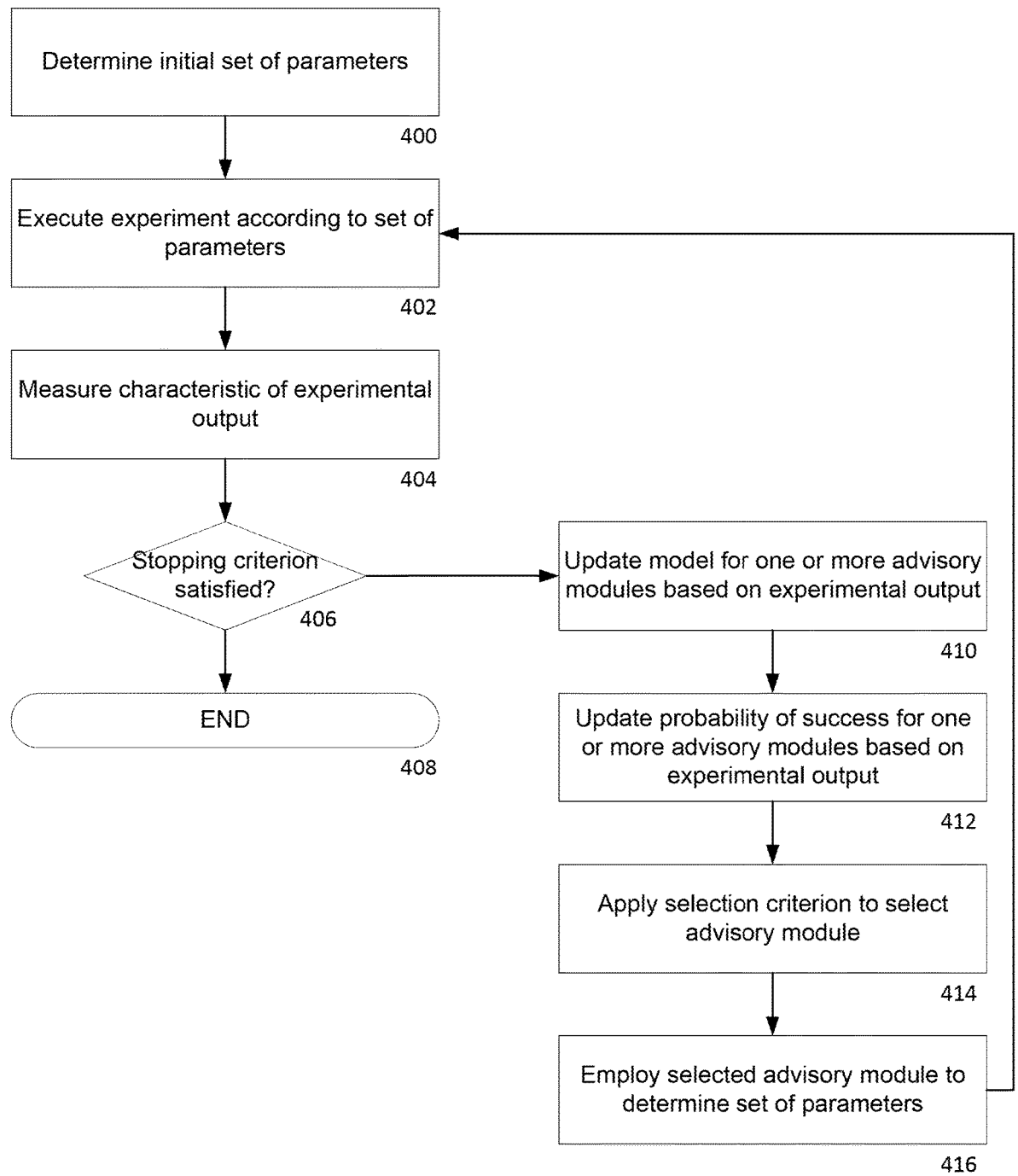
FIG. 4 is a flow chart.

FIG. 4 shows an example process for experimental discovery employing multiple advisory modules. Each advisory module implements a different approach to determining a set of parameters for an experiment, e.g., a different predicted relationship (e.g., model) between a set of parameters and a characteristic of a resulting experimental output.

At the outset of the process, an initial set of parameters is determined (400) for an initial experiment. The initial set of parameters can be chosen randomly, determined by one of the multiple advisory modules (e.g., a randomly chosen advisory module or an advisory module chosen based on initial probabilities of success for the advisory modules), or specified by an operator.

The experiment is executed according to the set of parameters (402) and an experimental output is produced. For instance, the experimental output can be a physical structure, e.g., a thin film structure, a bulk material, a compound, a molecule, a pharmaceutical, a paint, a food item, a structure, or another experimental output. A characteristic of the experimental output is measured (404).

A determination is made as to whether a stopping criterion has been reached (406), e.g., a maximum number of experiments carried out, a maximum amount of resources expended, or a target value obtained for the objective function. If so, the experimental discovery process concludes (408). Otherwise, the experimental discovery process continues.

Based on the characteristic of the experimental output and the set of parameters used for the experiment, one or more of the advisory modules can update its predicted relationship between parameters and resulting experimental output (410). For instance, some predicted relationships can implement machine learning approaches that can be automatically updated upon receiving the measured characteristic.

The probability of success for one or more of the advisory modules can also be updated (412) based on the characteristic of the experimental output, e.g., based on how accurately the advisory module was able to predict the experimental output or how close the experimental output came to satisfying the objective of the experimental discovery process.

A selection criterion is applied to select an advisory module (414) to determine a set of parameters for a subsequent experiment. The selection criterion can be a random selection, a probabilistic selection based on the probabilities of success for the multiple advisory modules, a selection of the advisory module having the highest probability of success, or another selection criterion.

The selected advisory module determines the set of parameters for the subsequent experiment (416). For instance, the selected advisory module uses its predicted relationship between parameters and experimental output to determine a set of parameters that will produce an experimental output that is likely to satisfy the objective of the experimental discovery process. The experiment is then executed according to that determined set of parameters (402).

Figure 5:
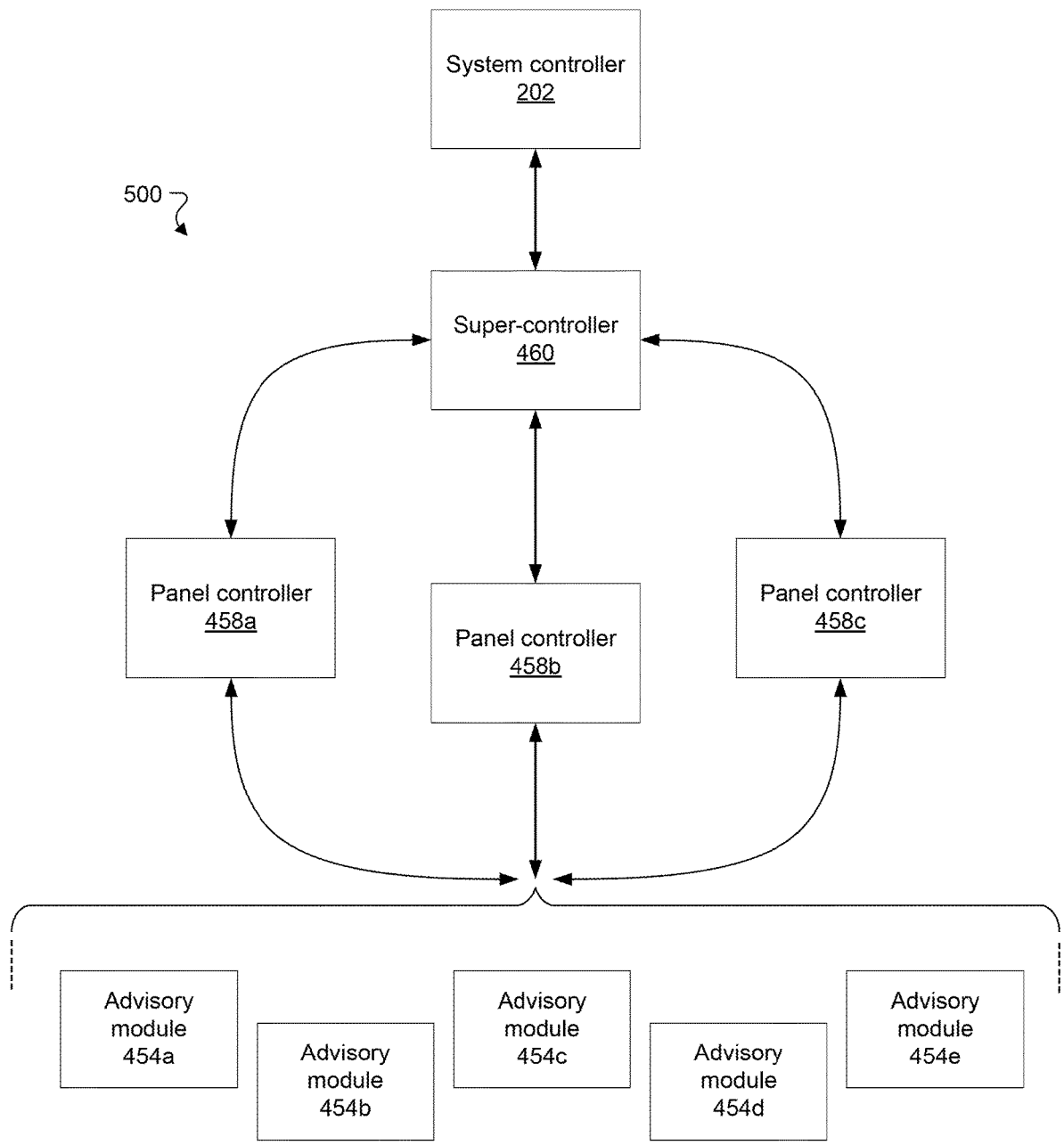
FIG. 5 is a diagram of a system for implementing experimental discovery processes.

Referring to FIG. 5, in some examples, a system 500 can be structured as a tiered system, e.g., as a tree (as shown) or as a directed acyclic graph having of panel controllers. For instance, each of multiple panel controllers 458a-458c (collectively 458) can implement a different approach to selection of advisory modules 454a-454e (collectively 454), and a super-controller 460 can select the panel controller 458, which in turn selects an advisory module 454 to determine a set of parameters for a given experiment. In the example of FIG. 5, the panel controllers 458 all draw from the same set of advisory modules 454. In some examples, each panel controller 458 can draw from a separate set of advisory modules 454, or there can be incomplete overlap between the sets of advisory modules 454 from which each panel controller 458 draws. In the system 500, the panel controllers 458 acts as advisory modules of sorts with respect to the super-controller 460 in that the panel controllers 458 each offer a different approach to determining the set of parameters (e.g., by way of their approaches to selecting advisory modules 454).

Figure 6A:
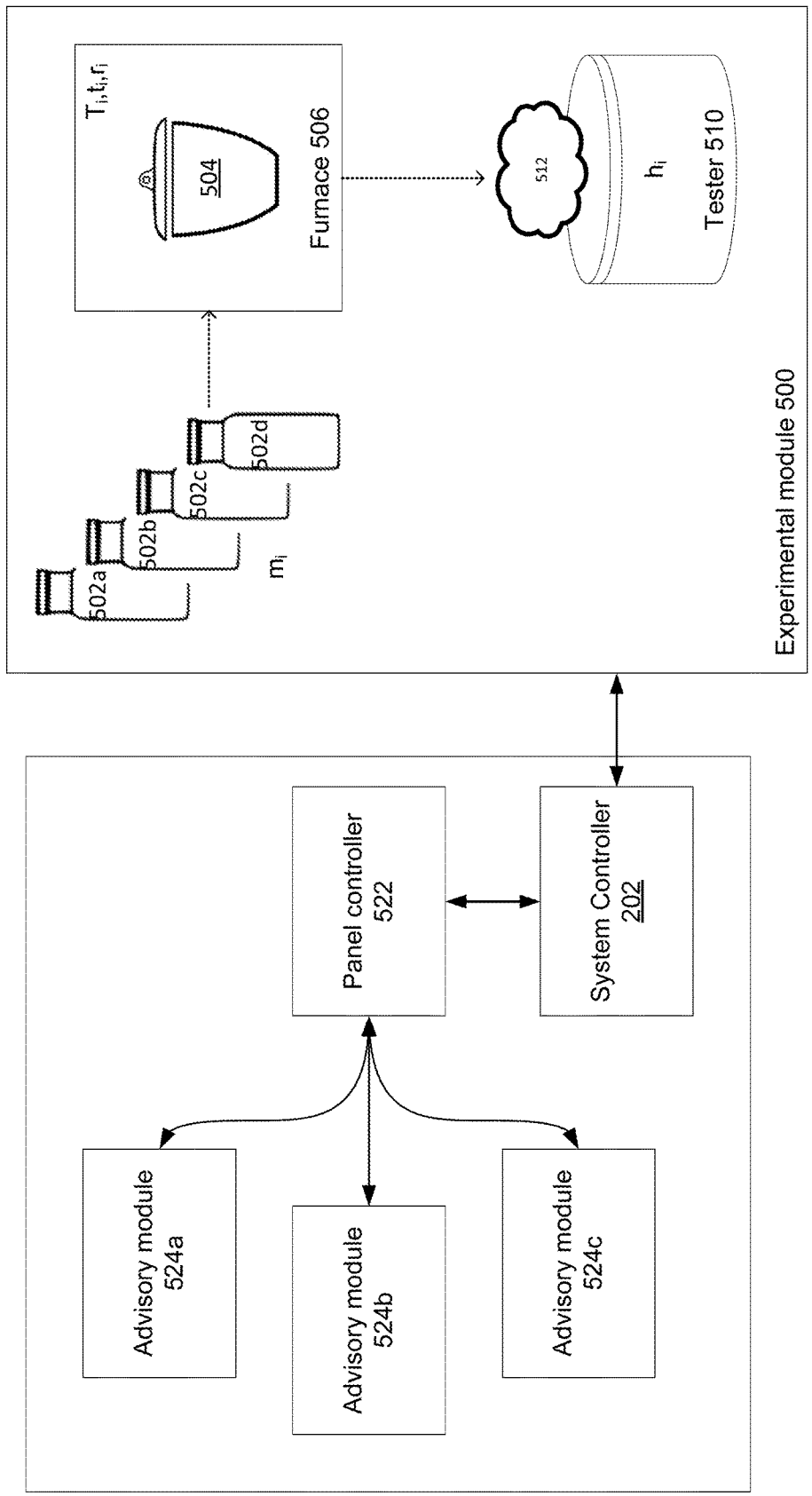
FIG. 6A is a diagram of a system for implementing an experimental discovery process.
Figure 6B:
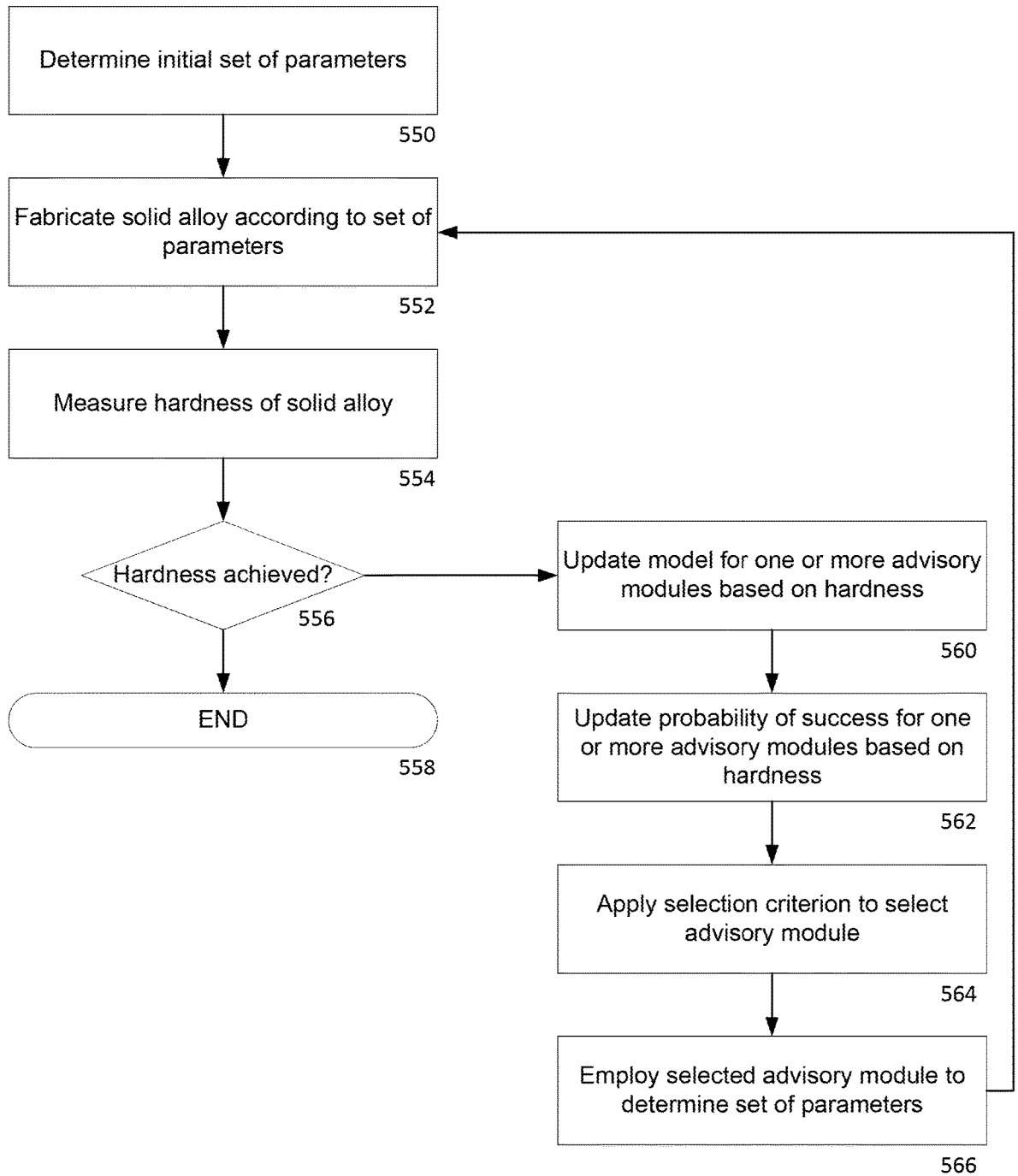
FIG. 6B is a flow chart.

Referring to FIGS. 6A and 6B, in a specific example, the experimental discovery process described here can be applied to maximize the hardness of a quaternary metal alloy. The hardness is the objective function and the stopping criterion is a hardness of at least 95 on the Rockwell scale or the completion of at least 25 experiments.

To fabricate a quaternary metal alloy in an experimental module 500, powders 502a-502d of the four elements of the alloy are weighed and combined in a crucible 504, heated in a furnace 506 to a target temperature $T_i$ (e.g., a temperature sufficient to melt the four powders) and maintained at the target temperature for an amount of time ti, and allowed to cool at a specified rate $r_i$, yielding a solid metal alloy 512. The resulting solid alloy 512 is polished on one surface in a polisher and tested with a hardness tester 510. In this example, the experimental module 500 encompasses the furnace 506, the polisher, and the hardness tester 510.

The parameters to be determined by the advisory modules for each experiment i are the mass ratios mi of the four elements used in the alloy, the target temperature $T_i$ to which the material is heated during processing, the amount of time $t_i$ for which the material is held at the target temperature, and the cooling rate $r_i$. The experimental output data is the hardness measurement $h_i$ from the hardness tester 510.

The experimental discovery process is controlled by a system controller 520. A panel controller 522 selects from among multiple advisory modules 524 to provide parameters for each experiment. Each advisory module implements a model of the relationship between the set of parameters and the hardness of the solid alloy 512.

To carry out the experimental discovery process, an initial experiment is executed with a first set of parameters (mass ratios, target temperature, holding time, and cooling rate) to fabricate a first solid alloy (552), and the hardness of the solid alloy is measured (554).

If a hardness of at least 95 has been achieved or at least 25 experiments have been carried out (556), the process is stopped (558). Otherwise, based on the hardness of the fabricated solid alloy and the set of parameters for the fabrication, the predicted relationship between parameters and experimental output is updated for one or more of the advisory modules (560). The probability of success for one or more of the advisory modules can also be updated based on the hardness of the fabricated solid alloy (562).

A selection criterion is applied to select an advisory module (564) to determine a set of parameters for the fabrication of a subsequent solid alloy. The selected advisory module determines the set of parameters for the subsequent experiment (566). Another solid alloy is then fabricated according to that set of parameters (552). The selection of an advisory module from among multiple advisory modules, each implementing a different approach to selecting the parameters, can enable the hardness of the solid alloy to more quickly converge to the target value.

In some examples, fewer parameters can be determined by the advisory modules. For instance, the cooling rate can be not subject to determination by the advisory modules, e.g., can be uncontrolled or can be held constant across all experiments.

In some examples, this experimental discovery process can be expanded to include one or more additional steps, such as anneal after the initial heating and cooling. The additional steps can have parameters that can be determined by the advisory modules, e.g., the time and temperature for the anneal.

During execution of the experiments, there can be sources of noise or error causing the actual values achieved in an experiment to not match exactly what is suggested by the advisory modules. Sources of noise or error can be, e.g., operator error in weighing the powders, imprecision in the scale used to weigh the powders, or imprecision in the temperature control of the furnace. If these sources of noise or error are determined to be significant, e.g., by the system controller 520 or by an operator, the system controller 520 may control the experimental module 512 to carry out multiple experiments at each set of parameters.

In some examples, the process can be subject to systematic error, e.g., in the parameters or in the hardness measurement. For instance, a systematic error in temperature measurement can arise because the thermometer in the furnace measures the temperature of the crucible and the temperature of the melt inside the crucible differently. Systematic error can generally be tolerated during the experimental discovery process without the need for multiple experiments, e.g., provided the measurements are robust relative measurements.

In some examples, information descriptive of the experiment other than the experimental output data (referred to as metadata about the experiment) can be provided to the advisory modules for use in determining a next set of parameters. Metadata about the experiment can include, for instance, measured values of the parameters, experimental conditions, or other information.

The approaches to experimental discovery described here can be implemented in a variety of other contexts.

In the context of materials development or design, experimental modules can include any equipment for the fabrication or synthesis of a material (e.g., heating systems, deposition systems, molding systems, or other fabrication equipment) and any measurement devices capable of measuring a target property of the fabricated material (e.g., optical metrology devices, electrical metrology devices, hardness testers, microscopes, spectrometers, or other measurement devices).

The approaches to experimental discovery can be used in chemistry, biochemistry, or drug development, e.g., to guide the synthesis of compounds or molecules (e.g., pharmaceuticals) or to identify compounds or molecules having desired properties. In the context of chemistry or biochemistry, experimental modules can include any equipment for the synthesis of a compound or molecule (e.g., reactors, columns) and any measurement devices capable of measuring a target property of the synthesized compound or molecule (e.g., spectrometers, pharmacological assays, microscopes, or other measurement devices).

The approaches to experimental discovery can be used for developing food preparation techniques or recipes. The approaches to experimental discovery can be used for developing paint formulations, e.g., paint formulations having a desired visual effect, a desired resistance to weather or mechanical abrasion, or other types of paint formulations.

The approaches to experimental discovery can be used in mechanical or structural engineering, e.g., in real or simulated construction. For instance, experiments can be carried out in which beams are arranged differently to form a structure, and stresses in the structure can be determined.

A number of embodiments have been described. Nevertheless, it will be understood that various modifications may be made without departing from the spirit and scope of the invention. For example, some of the steps described above may be order independent, and thus can be performed in an order different from that described.

Other implementations are also within the scope of the following claims.

What is claimed is:

1. A computer-implemented method for producing an experimental output satisfying an objective, the method comprising:
    conducting an experimental execution process, comprising:
        by a computing system, applying a selection criterion to select a particular approach to determining a set of parameters from among multiple approaches;
        by the computing system, determining a first set of parameters for a first set of one or more first experiments according to the particular approach, the determining being based on (i) a respective predicted relationship for the particular approach between a set of parameters and a characteristic of a corresponding experimental output, wherein the respective predicted relationship for the particular approach is different from predicted relationships for other approaches of the multiple approaches (ii) the objective for the experimental output, and (iii) a respective parameter selection rule for the particular approach, wherein the respective parameter selection rule for the particular approach is different from parameter selection rules for the other approaches of the multiple approaches; and
    controlling execution of the first set of one or more first experiments according to the first set of parameters, the execution of each first experiment including:
        conducting the first experiment according to the first set of parameters to produce a first experimental output; and
        measuring the characteristic of the first experimental output;
    determining that the objective is not satisfied by the experimental execution process; and
    in response to determining that the objective is not satisfied by the experimental execution process, conducting a subsequent experimental execution process including applying the selection criterion to select an approach from the multiple approaches.

2. The method of claim 1, in which the applying of the selection criterion is based on the objective and on a probability of success in achieving the objective associated with each of the multiple approaches.

3. The method of claim 2, comprising updating the probability of success associated with one or more of the multiple approaches based on the measured characteristic of each first experimental output.

4. The method of claim 3, in which applying the selection criterion in the subsequent experimental execution process comprises selecting, from among the multiple approaches, a second particular approach based on the updated probability of success.

5. The method of claim 1, in which the applying of the selection criterion includes a random selection of the particular approach.

6. The method of claim 1, in which the respective parameter selection rule for the particular approach is at least partially random.

7. The method of claim 1, comprising iteratively
    determining whether the objective is satisfied, and conducting the subsequent experimental execution process when the objective is not satisfied.

8. The method of claim 7, comprising stopping the iterations when the objective is satisfied.

9. The method of claim 1, in which the objective is indicative of an optimization of an objective function subject to one or more experimental constraints, and in which determining that the objective is satisfied comprises (i) determining whether the characteristic of the first experimental output satisfies the optimization of the objective function and (ii) determining whether the one or more experimental constraints have been satisfied.

10. The method of claim 1, comprising updating the respective predicted relationship for the particular approach between the set of parameters and the characteristic of the corresponding first experimental output based on the measured characteristic of each first experimental output.

11. The method of claim 10, in which updating the respective predicted relationship for the particular approach comprises updating a machine learning model based on the measured characteristic of each first experimental output.

12. The method of claim 1, in which applying the selection criterion to select the particular approach comprises performing a tiered selection process.

13. The method of claim 1, in which applying the selection criterion to select the particular approach comprises selecting a plurality of approaches; and in which determining the first set of parameters comprises synthesizing parameters determined by each of the plurality of approaches.

14. The method of claim 1, in which conducting the first set of one or more first experiments comprises fabricating a physical sample for each first experiment; and in which measuring the characteristic of each first experimental output comprises measuring a physical characteristic of each physical sample.

15. The method of claim 14, in which fabricating a physical sample comprises synthesizing a pharmaceutical.

16. The method of claim 14, in which fabricating a physical sample comprises fabricating a thin film structure.

17. The method of claim 14, in which fabricating a physical sample comprises fabricating a bulk sample of a material.

18. The method of claim 1, in which conducting the first set of one or more first experiments comprises performing a calculation for each first experiment.

19. The method of claim 1, in which the respective parameter selection rule for the particular approach comprises a random parameter selection, a grid search approach, regression, or a maximum likelihood approach, and
in which the parameter selection rule for at least one other approach of the multiple approaches comprises another of the random parameter selection, the grid search approach, the regression or the maximum likelihood approach.

20. The method of claim 19, in which the respective predicted relationship comprises a black box model, a gray box model, or a white box model.

21. The method of claim 1, wherein the respective predicted relationship for the particular approach comprises a model that is different from models of the predicted relationships for the at least one other approaches of the multiple approaches.

22. A system for producing an experimental output having a characteristic satisfying an objective, the system comprising:
an experimental module configured to conduct an experimental execution process comprising:
conducting a first set of one or more experiments according to a first set of parameters to produce corresponding first experimental outputs; and
measuring the characteristic of each first experimental output;
a computing system comprising one or more processors coupled to a memory, the computing system configured to control operation of the experimental module and to implement:
multiple advisory modules, each advisory module configured to determine a set of parameters for an experiment based on (i) a respective predicted relationship for the advisory module between a set of parameters and the characteristic of a corresponding experimental output, wherein the respective predicted relationship for the advisory module is different from predicted relationships for other advisory modules of the multiple advisory modules, (ii) the objective, and (iii) a respective parameter selection rule for the advisory module, wherein the respective parameter selection rule for the advisory module is different from parameter selection rules for the other advisory modules of the multiple advisory modules; and
a panel controller configured to apply a selection criterion to select a particular one of the advisory modules to determine the first set of parameters for the first set of one or more experiments, and to determine whether the objective is satisfied by the experimental execution process,
the computing system configured to control the experimental module to conduct a subsequent experimental execution process in response to the objective not being satisfied by the experimental execution process, the subsequent experimental execution process including applying the selection criterion to select an approach from the multiple approaches.

23. The system of claim 22, in which the panel controller is configured to select the particular one of the advisory modules based on the objective and on a probability of success in achieving the objective associated with each of the advisory modules.

24. The system of claim 23, in which the panel controller is configured to update the probability of success associated with one or more of the multiple advisory modules based on the measured characteristic of the one or more first experimental outputs.

25. The system of claim 24, in which applying the selection criterion in the subsequent experimental execution process comprises selecting, from among the multiple advisory modules, a second particular advisory module based on the updated probability of success.

26. The system of claim 22, in which the panel controller is configured to select randomly the particular one of the advisory modules.

27. The system of claim 22, in which a parameter selection rule for the particular one of the advisory modules is at least partially randomly.

28. The system of claim 22, in which the panel controller is configured to determine whether the objective is satisfied iteratively with the conducting of the subsequent experimental execution process.

29. The system of claim 28, in which the panel controller is configured to stop the iterations when the objective is satisfied.

30. The system of claim 22, in which the objective is indicative of optimization of an objective function subject to one or more experimental constraints, and in which determining whether the objective is satisfied comprises (i) determining whether the characteristic of the first experimental output satisfies the optimization of the objective function and (ii) determining whether the one or more experimental constraints have been satisfied.

31. The system of claim 22, in which at least one of the advisory modules is configured to update the corresponding predicted relationship based on the first set of parameters and the measured characteristic of the one or more first experimental outputs.

32. The system of claim 22, in which the experimental module is configured to:
conduct the first set of one or more experiments to produce corresponding first physical samples each fabricated according to the first set of parameters; and
measure a physical characteristic of each first physical sample.

* * * * *